(12) United States Patent
O'Neill (10) Patent No.: US 7,457,267 B1
(45) Date of Patent: Nov. 25, 2008

(54) METHODS AND APPARATUS FOR QUICKLY EXPLOITING A NEW LINK DURING HAND-OFF IN A WIRELESS NETWORK

(75) Inventor: Alan O'Neill, Henley Beach (AU)

(73) Assignee: Qualcomm Incorporated, San Diego, CA (US)

( * ) Notice: Subject to any disclaimer, the term of this patent is extended or adjusted under 35 U.S.C. 154(b) by 782 days.

(21) Appl. No.: 10/266,244

(22) Filed: Oct. 8, 2002

Related U.S. Application Data (60) Provisional application No. 60/328,468, filed on Oct. 10, 2001.

(51) Int. Cl.
*H04Q 7/00* (2006.01)
*H04Q 7/20* (2006.01)

(52) U.S. Cl. .................. 370/331; 370/332; 370/333; 455/436; 455/442

(58) Field of Classification Search ............ 370/328, 370/329, 331, 332, 338, 351, 352, 389, 401; 455/453
See application file for complete search history.

(56) References Cited

U.S. PATENT DOCUMENTS

| | | | |
|---|---|---|---|
| 4,833,701 A | 5/1989 | Comroe et al. .............. 455/509 |
| 5,267,261 A | 11/1993 | Blakeney, II et al. ......... 370/332 |
| 5,491,835 A | 2/1996 | Sasuta et al. ................ 455/509 |
| 5,572,528 A | 11/1996 | Shuen ........................ 370/402 |
| 5,933,787 A * | 8/1999 | Gilhousen et al. ............ 455/438 |
| 6,144,671 A | 11/2000 | Perinpanathan et al. ...... 370/409 |
| 6,161,008 A | 12/2000 | Lee et al. .................... 455/415 |
| 6,195,705 B1 | 2/2001 | Leung ........................ 709/245 |
| 6,256,300 B1 | 7/2001 | Ahmed et al. ............... 370/331 |
| 6,308,267 B1 | 10/2001 | Gremmelmaier ........... 713/168 |
| 6,366,561 B1 | 4/2002 | Bender ...................... 370/238 |
| 6,400,722 B1 | 6/2002 | Chuah et al. ................ 370/401 |
| 6,407,999 B1 * | 6/2002 | Olkkonen et al. ........... 370/389 |

(Continued)

FOREIGN PATENT DOCUMENTS

| | | | |
|---|---|---|---|
| GB | 2429608 A | * | 2/2007 |
| WO | 95/12297 | | 5/1995 |

OTHER PUBLICATIONS

C. Perkins, Editor "IP Mobility Support", Network Working Group, pp. 1-79 (Oct. 1996).

(Continued)

*Primary Examiner*—Firmin Backer
*Assistant Examiner*—Farah Faroul
(74) *Attorney, Agent, or Firm*—Michael P. Straub; Kam T. Tam; Thomas R. Rouse (57) ABSTRACT

A method to deliver traffic to a mobile node that is undergoing a hand-off between two Access Routers (AR) is described. The method of the present invention operates to perform the following. Decrease or minimize, delays between the time the old link breaks and the first packet is sent from the new link. Reduce or eliminate packet bursts from old to new Access Router (AR) when an old (existing) link breaks. Ensure that packets are neither lost nor duplicated during hand-off. Maintain Quality of Service (QoS) control of delivery order to the Mobile Node (MN). Make best use of multiple links during Make before break hand-off. Support both uplink and downlink traffic.

28 Claims, 3 Drawing Sheets

U.S. PATENT DOCUMENTS

| | | | |
|---|---|---|---|
| 6,434,137 B1* | 8/2002 | Anderson et al. | 370/347 |
| 6,445,922 B1 | 9/2002 | Hiller et al. | 455/433 |
| 6,446,127 B1 | 9/2002 | Schuster et al. | 709/227 |
| 6,466,964 B1 | 10/2002 | Leung et al. | 709/202 |
| 6,469,993 B1* | 10/2002 | Seo et al. | 370/329 |
| 6,496,492 B1* | 12/2002 | Zeng | 370/331 |
| 6,611,547 B1 | 8/2003 | Rauhala | 370/331 |
| 6,763,007 B1 | 7/2004 | La Porta et al. | 370/331 |
| 6,801,512 B1* | 10/2004 | Cudak et al. | 370/332 |
| 6,807,426 B2* | 10/2004 | Pankaj | 455/453 |
| 6,862,446 B2 | 3/2005 | O'Neill et al. | 455/422.1 |
| 7,002,936 B2* | 2/2006 | Agrawal et al. | 370/329 |
| 2001/0036164 A1 | 11/2001 | Kakemizu et al. | 370/331 |
| 2001/0041571 A1 | 11/2001 | Yuan et al. | 455/445 |
| 2001/0046223 A1 | 11/2001 | Malki et al. | 370/338 |
| 2002/0012332 A1* | 1/2002 | Tiedemann et al. | 370/335 |
| 2002/0015396 A1 | 2/2002 | Jung | 370/338 |
| 2002/0018456 A1 | 2/2002 | Kakemizu et al. | 370/338 |
| 2002/0026527 A1 | 2/2002 | Das et al. | 709/245 |
| 2002/0068565 A1 | 6/2002 | Purnadi et al. | 455/445 |
| 2002/0136226 A1 | 9/2002 | Christoffel et al. | 370/401 |
| 2002/0191593 A1 | 12/2002 | O'Neill et al. | 370/352 |
| 2003/0012179 A1 | 1/2003 | Yano et al. | 370/352 |
| 2003/0137961 A1 | 7/2003 | Tsirtsis et al. | 370/338 |
| 2003/0176188 A1 | 9/2003 | O'Neill | 370/331 |
| 2003/0214922 A1 | 11/2003 | Shahrier | 370/331 |
| 2003/0228868 A1 | 12/2003 | Turanyi et al. | 455/432.1 |
| 2004/0018841 A1 | 1/2004 | Trossen | 455/436 |
| 2006/0209686 A1* | 9/2006 | Wigard et al. | 370/229 |
| 2008/0170504 A1* | 7/2008 | Petrovic et al. | 370/235 |

OTHER PUBLICATIONS

Li, Yalun "Protocol Architecture for Univerisal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IEFT, Network Working Group, Request for Comments: 2206, RSVP Management Information Base Using SMIv2, pp. 1-60 (Sep. 1997).

IETF, Networking Working Group, Request for Comments: 2207, RSVP Extension for IPSEC Data Flows, pp. 1-14 (Sep. 1997).

IEFT, Network Working Group, Request for Comments: 2210, The Use fo RSVP with IEFT Integrated Services, pp. 1-31 (Sep. 1997).

IEFT, Network Working Group, Request for Comments: 2208, Resource Reservation Protocol (RSVP) Version 1 Applicability Statement Some Guidelines on Deployment, pp. 1-6, (Sep. 1997).

IEFT, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communications Review, vol. 29, No. 1, pp. 50-65, Jan. 1999.

TIA/EIA/IS-707A.8 "Data Service Options for Spread Sprectum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IEFT Internet Draft, draft-ieft-sip-manyfolks-resource-02.txt, Aug. 2001, pp. 1-28.

Andrew T. Campbell et al., "IP Micro-Mobility Protocols", ACM SIGMOBILE Mobile Computer and Communications Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002, pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

Network Working Group, IPv6 Prefix Delegation Using ICMPv6, pp. 1-33, Apr. 2004.

IETF Mobile IP Working Group, "Mobility Support in IPv6", D. Johnson, Rice University, C Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ieft.org on Dec. 29, 2004, pp. 1-92.

* cited by examiner

METHODS AND APPARATUS FOR QUICKLY EXPLOITING A NEW LINK DURING HAND-OFF IN A WIRELESS NETWORK

RELATED APPLICATIONS

The present invention claims the benefit of U.S. Provisional Patent Application Ser. No. 60/328,468 filed Oct. 10, 2001 titled "METHODS AND APPARATUS FOR QUICKLY EXPLOITING A NEW LINK DURING HAND-OFF IN A WIRELESS NETWORK", which is hereby expressly incorporated by reference.

FIELD OF THE INVENTION

The present invention relates to communications system and, more particularly, to methods and apparatus for implementing wireless communications systems.

BACKGROUND

Some link layers technologies (or mac technologies), like flash-OFDM developed by Flarion Technologies, Inc., provide a number (we use 16 for illustration but could be more or less) of mac_streams that each can hold a small number (e.g.: 1-10) of packets in them. In some systems of this type there is a potential for anything up to 160 packets or more that could be stored in mac_streams for a particular MN.

IP Packets (e.g.: 40-1500 bytes) are typically segmented into smaller mac_frames (e.g.: ~24 bytes) within each mac_stream. For purposes of explaining the invention we assume that Link Layer Automatic Repeat Requests (ARQs) includes frames but that they also retain the knowledge of packet boundaries as occurs in some systems. Also, for purposes of discussion, note that a packet may start or end within the middle of a frame.

Figure 1:
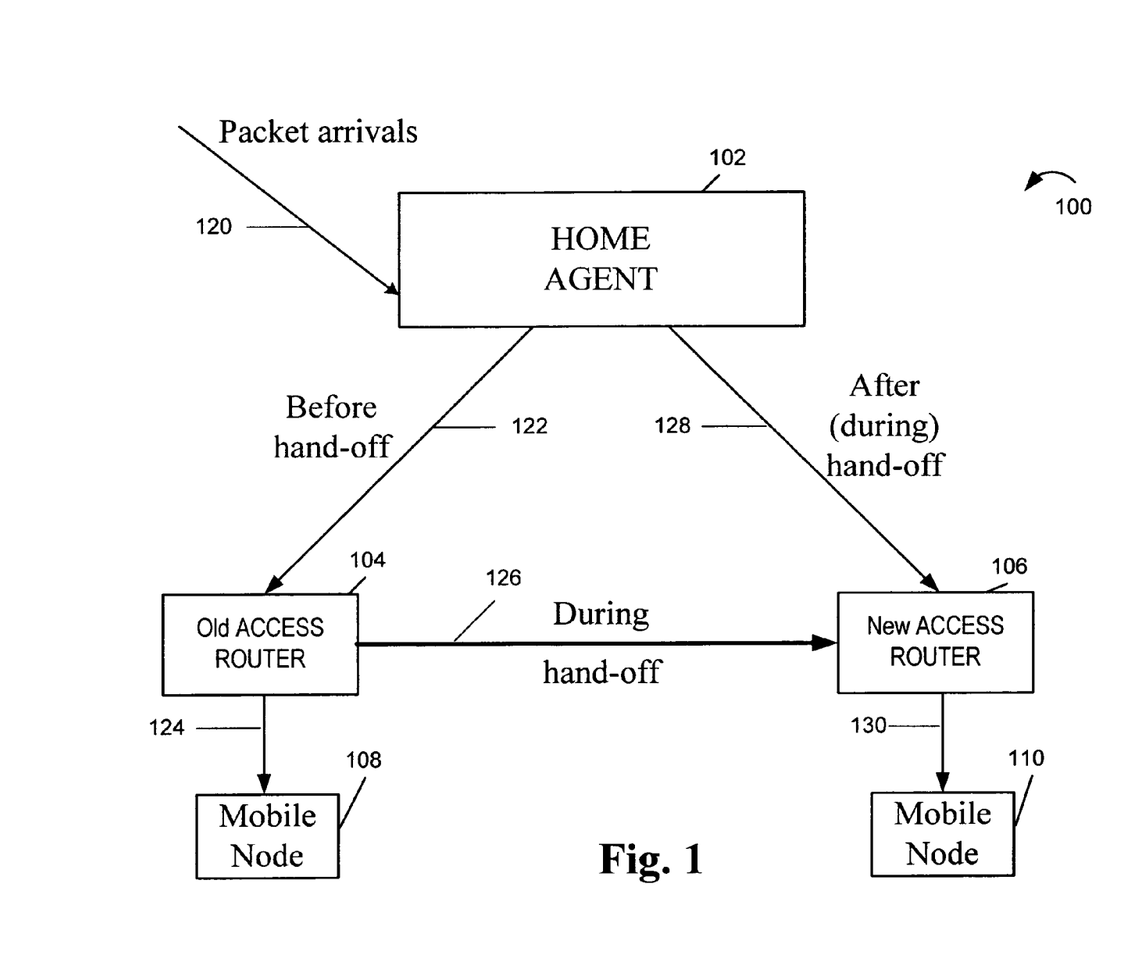
FIG. 1 illustrates a communication system implemented in accordance with the invention.
Figure 2:
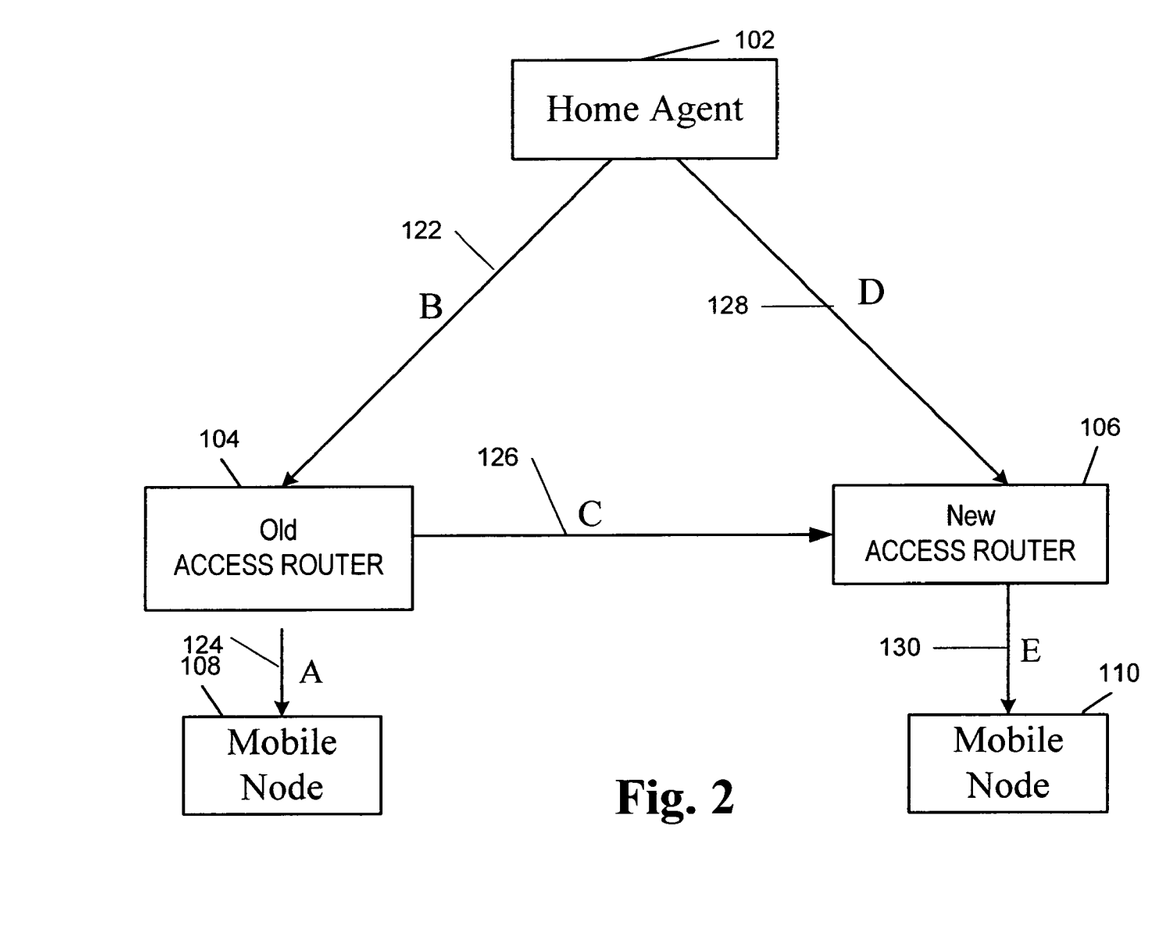
FIG. 2 illustrates packet and mac_frame flows, which occur in the system of FIG. 1.

During a hand-off a Mobile Node (MN) 110, e.g., portable receiver/transmitter, in a mobile (wireless) communication system connects to a new Access Router (AR) 106 and an indication is sent to the old AR 104 used by the MN 108 about the movement. The old AR 104 may then need to forward 126 to the new AR 106 any packets stored for that MN 108 within mac_streams at the old AR 104, and any subsequently arriving packets 122 for that MN 108, e.g., so that they can be transmitted 130 by the new AR 106 to the MN 110. A typical network scenario when using Mobile IP for general mobility management and inter-AR hand-off, is shown in FIG. 1. In FIG. 2, the various types of packet flows for this network configuration are shown and described below. The examples assume a wireless link between the MN and the ARs but can equally be applied to rapid hand-off across other types of access links.

A. Layer 3 Packets 124 already in the L2 mac layer at the old AR 104 for transmission to the MN 108. When the L2 mac layer link to the old AR breaks, then outstanding packets in flow A need to get to the MN 110 via another route 126, 130.

B 122. Layer 3 Packets yet to arrive at the old AR 104 from the HA 102 that need to get to the MN 108 in question. These are in-flight packets from the HA 102 when the MIP hand-off from the MN 108, 110 is received at the HA 102. Flow B packets 122 are therefore those that are received at the old AR 104 between the reception of the MIP hand-off signal at the old AR 104, and the reception of the MIP hand-off signal at the HA 102.

C 126. Layer 3 Packets that need to be forwarded between the old AR 104 and the new AR 106, because the MN 108 in question has left the old AR 104.

D 128. Layer 3 Packets yet to arrive at the new AR 106 from the HA 102, following HA 102 reception of the MIP hand-off signal. These packets 128 will be delivered to the MN 110 at the new AR 106.

E 130. Layer 3 Packets that will be sent to the MN 110 via the new AR 106 L2 mac_layer link.

Note that in general;

Flow $C=A+B$

Flow $E=C+D$

In addition, note that whilst the flows described are delineated as packets, it is equally applicable and beneficial to be able to redirect partial packets delineated as mac_frames, when part of a packet as frames has been sent 124 via the old link to the MN 108 before the old link was lost, necessitating the remaining frames in that packet to be forwarded 126 to the new AR 106 for forwarding 130 via the new link.

A range of hand-off scenarios can be envisaged in general, and specifically with this example network scenario, depending on the hand-off triggers from the link-layer and the IP layer, as well as the capabilities of the access links, ARs and MN.

In a L2 Break before Make (L2BBM), where the L3 can only be BBM by implication, the old link is lost, whether by accident or design, and the new link is only available after this event, and not before.

In a L2 Make Before Break (L2 MBB) with L3 BBM, the old and new links are available in parallel but the MN IP stack can only operate over one of these links at the same time and there is a finite time for moving to the new link and configuring the IP stack on the new link.

In a L2 Make Before Break (L2 MBB) with L3 MBB, the old and new links are available in parallel as are the MN IP stacks to exploit those links.

Where possible, it is useful to send all packets A 124 and B 122 over the old AR link before hand-off (C=0). However, in hand-off cases, where the old link is lost prematurely, the remaining IP packets and mac_frames at the old AR 104 should be transferred 126 to the new AR 106 so that they can be delivered 130 to the MN 110 over the new link, and hence effect a loss-less hand-off.

A first problem is apparent in that the old AR 104 needs to know what packets/frames must be forwarded 126 to the new AR 106 but only the MN 108 knows with certainty what was actually received 124 from the old AR 104. In addition, the new AR 106 needs to know what packets/frames need to be sent 130 over the new link to the MN 110. This is particularly difficult in cases where the links use Automatic Repeat ReQuest (ARQ) techniques to deliver mac_frames reliably by managing repeat attempts over access links, and by receiving reception acknowledgments from the MN 108, 110. In this case it is necessary for the old AR 104 to send its ARQ state forward to the new AR 106 along with the associated packet/frame data in a process known as Context Transfer. If too much data is sent forward (safety first) then duplicate information may be sent to the MN 108,110 over the two links (inefficient, reduced throughput and increased latency to other packets for the MN 108,110) whilst if insufficient data is sent forward then frame and hence incomplete packet loss may result.

A second problem is then clear in that the forwarded packets/frames 126 will take a finite time to reach the new AR 106 link, via a core (e.g., land based) network used to connect ARs 104,106, during which time packets/frames can't be delivered 130 to the MN 110 even if the new AR mac-layer or IP stack are already configured. This appears to the MN 110 as a lack of connectivity that will temporarily increase the latency of application packets in transit.

A third problem is then apparent if we try to forward over all packets/frames 126, for a specific MN 108 undergoing hand-off, as fast as possible to the new AR 106 to minimize this latency. The result will be a burst of packets on the backhaul uplink from the old AR 104, through the core network, and on the backhaul downlink to the new AR 106. This burst of packets 126 can interfere with other packets e.g. 128 on the links, potentially causing buffer overflows (losses), increased latency and/or reduced throughput for other application flows.

A fourth problem is that the competition between the forwarded packets/frames 126 for the handed off MN 108, 110, and other application flows for other MNs, normally occurs independent of the relative importance of the underlying application QoS (Quality of Service) requirements. If we forward all packets 126, 130 quickly to exploit the new link early, then we maximally affect other application flows, whilst if we smooth the forwarded flow 126, 130 over time then the new link is under-utilized.

In view of the above discussion it becomes apparent that there is a need for improved methods and apparatus for handling hand-offs, which address some or all of the above discussed hand-off problems.

DETAILED DESCRIPTION

FIG. 1 illustrates a system 100 in which the handoff methods and apparatus of the invention are used. The system 100 includes a home agent 102, old Access Router (AR) and new AR 106. The mobile node 108 is shown implementing a handoff from the old AR 104 to the new AR 106 where it is labeled 110.

Figure 3:
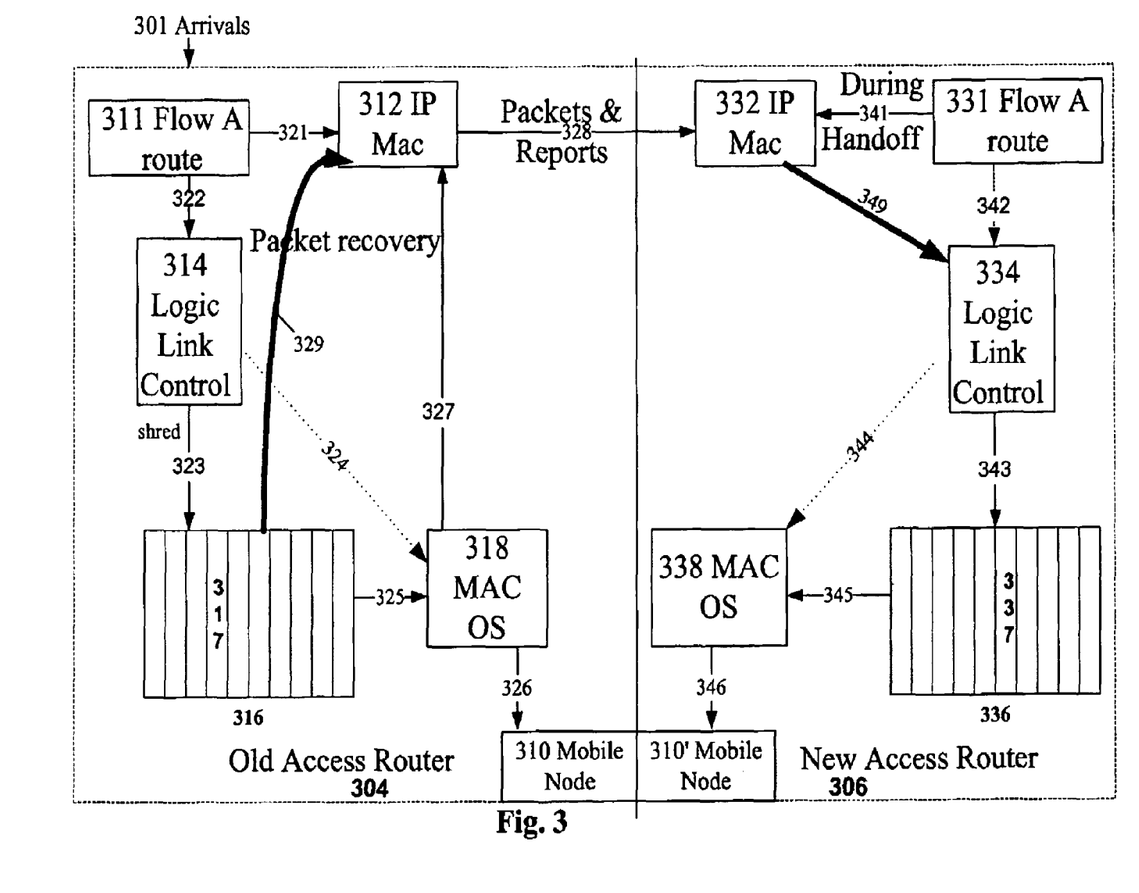
FIG. 3 shows hand-off signaling and processing performed in accordance with the invention.

FIG. 3 illustrates an old AR 304 and a new AR 306 implemented in accordance with the invention. Along with packet flows between the old AR 304 and new AR 306 as part of a mobile node handoff from the old AR 304 to the new AR 306. Mobile node 310 first has a connection with the old AR 304 and then with the new AR 306 with the new AR 306 being the AR to which the MN 310 is changing to as part of a handoff. Mobile node 310 is indicated as 310' when connected to new AR 306. However, in the text of this application, the mobile node will simply be referred to as 310.

1) QoS Control Over Forwarded Packet/Frame Delivery

In the old AR 304 and new AR 306, the packets and frames under delivery to a MN 310 will typically have been classified into QoS classes. Packets and frames of each class are then provided, based on the QoS class, the appropriate resources and scheduler behavior, for correct delivery over the access link. For example Voice packets will typically require much lower latency than bulk data and these relative performance bounds are well known. For discussion purposes, we will call the classified IP packets 322, and its constituent mac_frames 317 after those packets 322 have been fragmented at the link layer 314, to form a mac stream 316. In general, each packet 322 can start at any point within a mac_frame 317, following completion of a previous packet from the same mac_stream 316, with the location of the packet start therefore being offset from the frame start. The scheduler 318 will treat each mac_ stream 316 communicated by flow 325 independently, from a QoS perspective, as each constitutes a sequence of packets 322 that must be delivered in order, and the scheduler can allocate resources to each mac_stream 316 to affect relative mac_stream 316 performance. Note that whilst the packets 322 in each mac_stream 316 are delivered in order, the ARQ mechanism associated with each mac_stream 316 should be able to deliver mac_frames 317 out of order to support retransmissions of errored frames.

For ordered delivery of IP packets 301 within each mac stream, obviously,

Flow E=remaining A, then B, then D flow packets

For reliable packet delivery within each mac_stream 316, obviously, all outstanding packets, frames and associated ARQ state should be forwarded to the new AR 306 and the MN 310 should internally transfer the ARQ state for the old AR link 326 to the new AR link 346.

In accordance with a first feature of the invention the transfer 328 of the said packets, frames and ARQ state is split up into multiple parallel and serial phases, with one parallel phase for each mac_stream 316, each parallel phase then being broken up into multiple serial phases. Said phases and associated data are marked in sympathy with the QoS marking of the associated mac_stream 316, and then treated during forwarding 328 and Context transfer according to the relative QoS marking between other competing mac_streams from the same MN 108, and relative to forwarded mac_streams from competing MNs undergoing hand-off, and relative to other application flows to stationary MNs.

To facilitate this, the forwarded IP packets and frames 328 are appropriately marked using the IP header Type of Service or Diff-serv Code Point (TOS/DSCP) QoS fields for the mac_ streams e.g., 316, appropriate bandwidth is assigned on the affected links (old AR backhaul uplink, in the core, and on the new AR backhaul downlink) for forwarded packets as part of hand-off, and a sympathetic scheduling algorithm 318, 338 is employed on these links and in the old and new AR mac layer, to arbitrate between the multiple flows on any link to ensure timely and fair delivery of packets and frames on the links.

The parallel phases between each mac_stream enables each new AR mac_stream 336 to be configured and populated with data at a rate suitable for that mac_stream for that MN 310 and specifically enables different MNs to have differential hand-off performance according to their service level (e.g., gold, silver, bronze, etc.).

The serial phases enable the context transfer to be undertaken in multiple stages, as not all data in any mac_stream 316 needs to get to the new AR 306 early, immediately, or at all. Only sufficient data needs to be sent to avoid the new AR 306, and hence the MN 310, from being starved of critical packets. The appropriate set of serial phases for a particular MN 310 and mac_stream 316,336 depends on other techniques described below as well as scheduler QoS configuration in the old AR 318. In particular, given network conditions and by using packet timestamps and serial numbers, the schedulers used in a system implementing the invention can detect stale and unwanted mac_frames and discard them locally rather than fruitlessly forwarding them to the new AR 306 where they will be dropped anyway.

Hand-off 'aggressiveness' in terms of advanced forwarding for any MN mac_stream 316 is controlled by the number of competing hand-offs at any point in time, the amount of bandwidth/latency assigned to those hand-offs on a per service level basis, the service level and other QoS attributes of a particular MN 310, the QoS attributes of the mac_stream 316, the number of packets and frames 317 in said mac_stream 316 that need to be transferred 328 to the new AR 306, the complexity of the associated ARQ state that itself is dependent on the retransmission status of frames within the mac_stream 316.

The advantages of this invention is that we get QoS control of hand-off providing early fair use of the new link 346, strict ordering of packets 301 is maintained with minimal duplication over the air-link, hand-off burstiness (to this and other MN traffic) is prevented, packets can be intelligently dropped early, and hand-off aggressiveness is controlled and can be sympathetic to link/network conditions.

2) ARQ State Scheduling

One feature of this invention is to break the old link state into different serial phases/packets/QoS markings so that QoS queuing can treat them correctly. Specifically, rather than waiting until the old link breaks, the ARQ state is sent gradually over from the moment the hand-off process starts and the new AR address is known. In accordance with the invention each mac_stream 316 has an Identification (ID). Each packet in the stream has a Sequence Number (SN) and an Offset for example. This Offset indicates the ARQ frame number 317 for the start of that packet and the byte offset of the packet start within that frame. The position of each byte in an IP packet is then known in its constituent frames. The packet sequence number increases the effective size of the frame numbering space from what is normally a relatively small ARQ retransmission window (typically 256). The packet sequence number can be used to detect packets that get lost/re-ordered during forwarding from old to new ARs 304, 306, and the mac_frame number 317 and offset from front of packet is used to locate any packet in a normalized ARQ space for each mac_stream 336 at the new AR 306. The combination of the packet SN and the ARQ SN, hence referred to as the SN, uniquely identifies a mac_frame 317,337 in the system, and the offset of the packet within a mac_frame 317, 337 enables the packet boundary to be tracked.

The complete ARQ window state for each mac-stream would be, for example;

i) SN_Rightmost: SN of the next frame to be sent.

ii) A vector of Boolean elements, where the length of the vector is ARQ_WINDOW_SIZ, and each element indicates whether the corresponding frame is to be retransmitted (i.e. is outstanding at the MN as an ARQ Ack has not been received at the AR). The 1st element corresponds to frame SN=SN_Rightmost−ARQ_WINDOW_SIZ, and the last element corresponds to frame SN=SN_Rightmost−1.

iii) Fragmentation information of packets into frames. In order to start the new link at the new AR, the new AR should have the same fragmentation information and implement the same fragmentation and hence packet offsets within frames as the old AR 304 for flow A. This is so that frames 317 to be retransmitted at the old AR 304 can also be retransmitted without reformatting 337 at the new AR 306 or updates to the MN ARQ information. This could be limited to the packet SNs in the window, and be represented as the ARQ SN range for each packet and the offset of the start of the packet from the front of the first frame in that ARQ SN range. Other representations are possible and useful.

a) The ARQ state when the hand-off starts can be sent over to the new AR immediately in an ARQ synch report 327, 328 to prepare the packet sequence numbers and associated byte offsets and ARQ SN starting points for each mac_stream 336 on the new link 346. The packet sequence number space is independent for each mac_stream 316, 336, as we only need ordered delivery within a mac_stream 316, 336. It is required because the small ARQ SN space, also independent for each mac_stream 316, 336, can easily wrap within a single packet, and so the combination of the packet and ARQ SNs can uniquely identify a mac_frame 317, 337 in the system. The ARQ state report 327 will likely create a small packet for each mac_stream and can be treated by the QoS queuing according to the QOS class of the data packets within that mac_stream. Best effort data ARQ SN and offset info can and in various embodiments is, sent slower than the same state for voice mac_stream. It can be beneficial to aggregate the state for multiple mac_streams into a single packet to avoid lots of small packets and treat the aggregate packet at the highest QoS of the contained mac_stream ARQ state. Accordingly, in some embodiments such aggregation is used.

b) As packets continue to flow over the old link 326, the packet and ARQ SN space will evolve, and updates (transmission reports) 327 are sent 328 over to the new link 346 to keep it informed of progress so that it can advance the ARQ window state in step with the old AR 304. This incremental state can be aggregated into a single packet for a plurality, e.g., all or some, of the mac-streams 316 for a MN 108,110, or across many MNs undergoing hand-off.

c) Flow A packets will continue to be forwarded over the old link 326, and then flow B packets 301 will begin to arrive at the old AR 304. Some time later the old link 326 will either fail or will be dropped in a controlled manner to be replaced by the new AR link 346. At this point a final ARQ state report 327 will be sent 328 to detail the final packet SN and ARQ SN information for each mac_stream 316 in flow A. This incremental state can potentially be aggregated into a single packet for all/some of the mac-streams for a MN 310, or across many MNs completing hand-off.

3) Packet Forwarding and Queuing Strategy

An example packet forwarding strategy is one feature of this invention. The packet forwarding strategy sends all flow A packets 322 down the old link 326 whilst sending 321,328 flow B packets 301 (that arrive at the old AR after MIP hand-off commences) to the new AR 306. Flow D will arrive at the new AR 306 directly of course as a result of the MIP hand-off signal at the HA 102.

We wish to ensure that the MN 310 receives flow A, then flow B then flow C packets in order in each mac_stream 337. Therefore, at the new AR 306, flow D packets are queued 341,332 behind flow B packets 301,321,328, and neither should be sent 349, 343, 345, 346 to the MN 310 until flow A has been delivered to the MN 310 and the old link 326 dropped in a planned hand-off.

However, the old link 326 can be dropped at any time as a result of radio effects, forcing the timing of the hand-off. In this case, all the flow A packets might not have been delivered over the old link 326, and no flow B packets 301 might have arrived at the old AR 304 for forwarding, or those that have arrived might not have arrived 328,332 yet at the new AR 306 for the new link 346. We therefore have to still ensure that flow A, B and D packets can still be delivered in order to the MN 310, and ensure that the right packets are available at the new link 346 quickly so that the new link 346 can be used immediately after the old link 326 is dropped. Note that the arrival of flow B packets 301, 321,328 at the new AR 306 does not help us here if there are still flow A packets unsent 325 at the old AR 302. We still need to delay flow B packets until the unsent flow A packets (and constituent frames) have been sent over to the NAR 306. Note that this is not strictly necessary from a packet re-ordering perspective because many applications can cope with some re-ordering. However this may be beneficial for some applications that cannot cope with re-ordering and hence a characteristic of the specific mac_stream 316 used by that applications for its packets.

An additional aspect of this invention is therefore to queue packets from flow A, B and D in such a way that ordered delivery is maintained. This means flow B packets 301 are not sent 349 to the mac_layer 334 in the new AR 306, and fragmented or shredded into mac_frames 337 until the remaining flow A mac_frames 317 from the old AR 304 are received 329,328,349,343 at the new AR 306 following the loss of the old link 326. In addition, flow D packets 341 from the HA should be held up 332 behind both flow A and flow B packets.

An alternative and preferred implementation of this invention is to instead keep flow B packets 301 in the old AR 304 and classify 311,322 and queue them 323 behind the flow A packets into the mac-streams 316, and then send 329 remaining flow A packets (and frames) and then flow B packets to the new AR 306 when the old link 326 breaks. Note that this means that the hand-off signal from the new AR 306 to the old AR 304 does not affect flow B routing and it is only the breaking of the old link 326, with packets still outstanding in the old AR mac_streams 316 that causes packets to be forwarded to the new AR 306 as flow C 328.

Thus, ordering is controlled at the old AR 304 rather than at the new AR 306 between flow A and flow B, whilst ordering between A/B 328 and flow D 341,342 is controlled at the new AR. Whichever strategy we use though, we still have potentially ARQ state 327 and a lot of packets/frames to send 328 to the new AR 306 before the new link 346 can be used (more to be sent if A/B ordering is controlled at the new AR 306 of course).

4) Flow A/B Delivery Control Observations

The earlier we start the hand-off (higher signal to noise radio power threshold for hand-off) the longer the old link 326 can be up to forwarding remaining packets, at an increased cost to the overall system because of transmit powers to/from two base stations and the occupancy of two sets of radio resources such as tones and session ids etc.

The faster we try to make the hand-off, increasing efficiency of the radio system, the less chance we will have to drain flow A (and optionally B) over the old link 326.

We cannot predict how quickly the S/N will drop on the old link 326 in the future, so some unplanned (i.e. unexpected and premature) old link removal will still occur, independent of the above timings.

We cannot send 328 remaining old link 326 flow A frames 317 instantaneously to the new AR 306, and the delay will depend on paths lengths, network buffer status, QoS settings on the transferred packets.

We can therefore increase radio costs to increase probability that flow A (and optionally B) is fully delivered over old link 326, then accept a certain level of unplanned drops and associated new link 346 delays whilst flow A (and B) information is transferred 328, or put in new mechanisms that increase the probability that flow A will be delivered over the old link 326 and increase the probability of the correct packet (by flow order per mac_stream) being available at the new link 346.

a) QoS Solution

One aspect of this invention is for the QoS scheduler 318 to assign increased priority to flow A packets from a MN 310 undergoing hand-off, relative to other MNs flow A packets not undergoing hand-off, so that for a given hand-off time, the probability of flow A packets across all mac_streams being delivered is higher. In such an embodiment, even if all packets are not drained over the old link 326, we have given the MN 310 earlier service than it would have got without a hand-off, which compensates for the future lack of service that the MN 310 will experience as a result of the remaining flow A packets being forwarded 328 to the new AR 306 after the old link 326 is dropped. The shorter the hand-off time, the more efficiently we use radio resources, so the greater the increase in priority we need to give to the flow A packets to make up for the potential flow A packet transfer 328 delay between the old AR 304 and the new AR 306.

Two limitations occur with this approach though. The first is that the increase in priority we can give the handing off MN 310 is limited by the effect of that higher priority on competing traffic to other MNs at the old AR 304. In the same way that the forwarded 328 flow A/B packets interfere with traffic on the uplink from the old AR 304 and on the downlink to the new AR 306, so transferring some of those packets over the old AR downlink 326 (in additional to normal QOS treatment for that MN) can interfere with other MNs traffic over the air-link. Conceptually, we would wish to bound the priority increase so that the interference from the hand-off of a MN 310 is shared equally between the MNs at the old and new ARs 304, 306.

The second limitation is that this oversending is still dependent on the characteristics of the air-link and at any moment we could find that, from a priority perspective, we would wish to preferentially schedule this MN 310 during the hand-off, but that at the same time the radio channel to that MN 310 is very bad due to instantaneous effects or planned transmit diversity cycle. Therefore whilst clearly useful this may not be a complete solution in some instances.

b) Early Packet Forwarding

As well as sending the ARQ state 327 early to the new AR 306, one aspect of this invention is for the old AR 304 to send a copy 329, 328 of a flow A (then B) packet to the new AR 306 when it reaches a mac_stream 316 specific trigger depth 317 away from the front of that mac_stream 316 queue. The closer a packet gets to the front of a mac_stream 316 queue, then the more likely it is to be approaching imminent service over the air-link 326, and hence the greater the need for it to be at the new AR 306, 346 when the old link 326 breaks. In particular, when a packet is in the ARQ loop and has seen service for one of its associated mac_frames 317, then on loss of old link 326, that mac_stream 316 cannot deliver any additional mac__frames 317 (including repairs of the sent frame) to that MN 310 from that mac_stream 316, 336, until the packet under service is sent to the new AR 346. Therefore as well as delaying service to this packet, any subsequent packets 322, 323 will also be blocked.

As a flow A packet progresses in the mac 316, it is marked when it reaches the trigger point 317, causing it to be forwarded to the backhaul QoS scheduler 329 along with an update of the ARQ progress 327 since the last report, and the ARQ SN information for this packet. This information 328 can be preferably combined into a single special packet (general ARQ plus packet ARQ state plus packet) or sent as two packets (general ARQ SN update+packet specific stuff) or even three individual packets. When combining the packet ARQ and actual packet into a single inter-AR packet (for example), the packet itself would be encapsulated before forwarding to the new AR 306 as in MIP, but will now include the ARQ_synch information which could be implemented as a shim layer underneath the MIP header or as an IP custom option header or a custom encapsulation. Note that the new AR 306 strips the ARQ_sync information 327 from the frames/packets before it delivers to the mobile node 310 in streams 345, 346.

At some point later, the data packet will be sent from the old AR 304, and eventually arrive at the new AR 306, as part of flow C. The packet sequence number information enables the new AR 306 to detect packet drops and adjust the mac-stream 336 and ARQ SN appropriately 338. As the ARQ SN updates are received at the old AR backhaul QoS scheduler 318, it can report on the completion or dropping of a previously delivered data packet copy from the old link mac_stream 316, and hence cancel 329 the transmission 328 of that data packet copy to the new AR 306. In addition, by sending that ARQ update 327, 328 onto the new AR 306, it can delete packets from the mac_stream queue 336 at the new AR 306, that have been delivered successfully (or dropped) from the old link mac_stream queue 316.

Some examples of non-exhaustive Trigger policies, which can be used, are;
  Forward when it approaches a specific point within the ARQ loop (front/back/next etc—ARQ technique dependent)
  Forward when it enters the mac 314 or even the IP layer 311, 321
  Forward when the trigger value for the required inter-AR bandwidth is reached. The required bandwidth is calculated from the present mac-stream 316 bandwidth between the old AR 304 and the MN 310 (i.e. the present service rate for the MN 310 over the air-link) and the measured/configured inter-AR path length.
  Forward to the new AR 306 at the rate of the old AR 304 to MN 310 link 326, in the expected scheduler packet delivery order across all mac-streams including mac-stream 316

Summary of Flow A/B Packet Delivery Control

The QoS mechanisms will try to improve the chance of flow A packets being delivered over the old air-link 326. Meanwhile, packets of high QOS flows are duplicated and sent early in flow 328 to the new AR 306 so that if the old link 326 breaks, these high QoS/low latency flows will be unaffected by the hand-off.

The longer we can afford to maintain the old link 326 in a planned hand-off, the less useful are the mechanisms described here, but they will always be useful for dealing with the unplanned loss of the old link 326. The longer the old link 326 is up, the less efficient is our use of the overall radio system resources and so appropriate alternative use of backhaul resources to save those air-link resources may be preferable.

Note that the greater the bandwidth per MN 310, as a fraction of the cell resource, the greater the saving as the required time to drain flow A for that MN 310 increases. In addition, the greater the service level of that MN 310 then the less effective is the use of the increased priority over the air-link 326 to drain flow A. Finally, the more bursty the packet arrivals 301 are for MN 310, the harder it is for the scheduler to instantaneously provide sufficient air-link resources to drain flow A because those resources would normally be spread over a period of time (but this is potentially ok because the fact that it would be spread over time at the old AR 304 means that it does not need to be instantaneously forwarded to the new AR 306).

5) Overall Implementations

In one implementation, packet copies and ARQ update signaling 327, 328, 329 is minimized in the old AR 304, by using the old link mac_stream 316 memory to hold the flow A packets that have reached the trigger point 317 in any mac_stream 316, until they have been scheduled by the backhaul scheduler 318. In addition, but independently, to efficiently maintain flow A/B ordering and to enable flow B packets to also be delivered over the old link 326 during BBM or MBB hand-offs, flow B packets should continue to be delivered to the old link mac_stream queues 316 as this will ensure they are classified 311,322 correctly behind the flow A packets, will only be forwarded to the new link 346 when they reach the trigger point 317, and will avoid the need for the hand-off completion timing being tied in an artificial way by the amount of packets in flow A when the hand-off commenced (e.g., by the desire to drain flow A over the old link 326, and to send all flow B packets to the new link 346, which leads to the problem of old link 326 under-utilization if there are no/few flow A packets when hand-off commences, and subsequently arriving flow B packets cannot make use of the old link 326).

Similarly, at the new AR 306, flow A and flow B packets arriving 328 at the new AR 306 should be placed in a single queue 332,349,343,336 in delivery order. This means only arriving flow D packets to the new AR 306 have to be kept in a separate queue 341,332 so that they can be added after hand-off completion 342 behind flow A and flow B packets, instead of having three queues which would be required if flow A and B weren't combined in order at the old AR 304, and if flow B was sent 328 to the new AR 306 in advance of flow A packets 325.

For the combined flow A/B queue at the new AR 306, this queue can be implemented at the IP layer 332 so that ARQ updates 328 can be efficiently processed without having to traverse the IP/mac interface 349. The IP A/B plus D queue 332 would only be pulled into 349 the layer 2 mac_streams 336 at the new AR 306 after the old link 326 is lost and the MN 310, 310' sends a request to use the new link 346. This is because we wish to delay fragmentation 334 of the IP packets into mac_frames 337 until the final required packets (for delivery to the MN 310 from the new AR 306) are known. This avoids the ongoing intermediate complications arising from the reformatting of the mac_frames 337 (offset and ARQ SN start) due to the variable length of IP packets, as any packet that has been copied 329,328 to the new AR 306 is completed at the old AR 304, or as forwarded packets 328 are reordered during forwarding or retransmitted or lost during forwarding. This also saves linked list manipulations if the ARQ SN space and associated mac_frames 337 are implemented as a linked list of address locations pointing to the start and stop of each mac_frame 337 of each packet in mac memory 336. Note that the transfer 349,343 of these packets into the mac-layer 336 could still be made before or after the final ARQ state information 327,328 is received from the old AR 304 on loss of old link 326.

An additional aspect of this invention is to send the IP queue 332 to the mac layer 336 before the final ARQ information 327,328 is received and restart sending from the front of the first packet in each mac_stream 336. This ensures that sending 345,346 can commence immediately the new link 346 is set-up, and is decoupled from the arrival of the final ARQ state 327,328 because there is a chance of this state being either delayed or dropped in error. The effect of this is that the MN 310 may receive duplicate ARQ SN transmissions, for mac_frames 317 that it signaled that it had received over the old link 326. This looks to the MN 310 like a false retransmission (a known ARQ possibility) that is caused by an ACK from the MN 310 being converted to a NACK at the AR 306 as a result of a transmission error. In this case though, it occurs with the addition of an increased delay (and SN evolution) between the original mac_frame 317 being sent (and ACKed) and the unnecessary retransmission 337 being made. This is because in one exemplary example of such an ARQ system, the receipt of the NACK blocks the sending of any new mac_frames 337 until the retransmission processing is completed, which bounds the ARQ SN evolution that can occur between sending a mac_frame 337 and receiving the associated NACK (propagation decode/encode and processing delays). This increased ARQ SN evolution can be handled provided the SN space cannot wrap in this time. It is therefore important that incremental ARQ SN progress information 328 is sent from the old AR 304 to the new AR 306 to minimize this duplication and avoid the wrapping, or the information 328 should include the packet SN information as well and be exchanged with the MN 310 before sending over the new AR link 346 (new AR 306 to MN 310 report). The MN 310 can then simply and safely compare the SN of any mac_frame 337 with its own SN state, during hand-off, and reACK the retransmissions even if the contents of the mac_frames 337 have been corrupted because the contents 317 have already been received at the MN 310 via the old link 326.

Additional protection from this ARQ SN wrap is provided of course if the IP packets 332 are not sent to the new link mac layer 336 until the final ARQ state is received 327,328. An additional aspect of this invention is therefore to send this final ARQ state information from the MN 310 to the new AR 306. This is useful whether or not the IP queue 332 is sent to the mac layer 336 with or without old AR final ARQ state 327,328. If the old AR final ARQ state 327,328 is not received, and the IP queue 332 is sent to the mac_layer 336, then the MN 310 final ARQ state report to the new AR 306 will be delivering very similar (but more accurate) information and will therefore minimize unnecessary retransmission. Even if the IP queue 332 is sent to the mac 336 after reception and application of the final ARQ state 327,328,344 from the old AR 304, the MN 310 has more accurate information on the ARQ state for what was actually received by the MN 310 (as opposed to what was sent by the old AR 304). Therefore, the MN 310 sending its final ARQ state information to the new AR 306 will suppress additional unnecessary retransmissions.

6) MBB ARQ Correlation

In the next aspects of this invention, called ARQ correlation, the tracking of the ARQ SN state 318 across multiple parallel AR links 326 during L2, and the sending of packet copies 329,328 to the new AR 306, enables the system to support the transmission of mac_frames 317, 337 from the same packets to the MN 310 in parallel from multiple ARs 304,306. The MN 310 will, for example, be able to select mac_frames 317,337 from either (any) link 326,346 for the same packet and will correlate ACKs and NACKs across the two links 326,346 so that successful mac_frame 337 reception over the new link 346 will result in an ACK being sent over both the old and new links 326,346 even though the mac_frame 317 from the old link 326 was received in error. ARQ update reports from the MN 310 can then be sent uplink to the ARs 304,306 (and exchanged between ARs 304,306) to prevent one AR 306 attempting to send a mac_frame 337 that has already been received 317 from the old link 326, and has the additional benefit of avoiding the need for the two links 326,346 to be synchronized (same mac_frame must be sent at the same time as in CDMA soft-hand-off). As the two links 326,346 have different error characteristics, loads etc so their ARQ spaces will move relative to each other enabling both to contribute to the safe and efficient delivery of each packet.

This mechanism will reduce the required S/N ratio required on a candidate new link 346 and for dropping the old link 326 because the combination of the two links 326,346 S/N ratio is reducing the effective BER, as in CDMA soft-hand-off. This is likely to produce operational and efficiency benefits for MBB capability.

7) Uplink Equivalents

In accordance with additional features of this invention, covering the case of the uplink transmission direction, the old AR 304 sends partially received packets 328, in the form of a subset of its component mac_frames 317, to the new AR 306 along with its final AR state 327,328, after old link breaks 326. The scheduler 318 is organized so that during hand-off whole packets are given higher priority than normal so that if a packet is started it is quickly completed in the uplink direction. These partially received packets potentially need to be sent 328 as soon as they are received, rather than as a block for the QoS reasons covered for the downlink direction. With early forwarding we therefore also send updates 327,328 to the old AR backhaul interface and the new AR 306 as whole packets are completed. The new AR 306 may or may not send any packets to the backhaul until the final ARQ report 327, 328 is received from the old AR 304 (although the cost of sending a whole packet unnecessarily here is much less in terms of bandwidth although it does result in a duplicate packet (one from each AR 304,306)) towards the session peer of the MN 310 undergoing hand-off. Therefore, the MN 310 should send its uplink final ARQ state to the new AR 306 because this provides faster delivery of this information to the new AR 306, as well as additional reliability, for the equivalent information from the old AR 304 although in this case it is the old AR 304 information 328 that is more accurate. Finally, soft hand-off involves the correlation of the received frames 317 from the old link 326, with the frames 337 received over the new link 346, in the new AR 306, so that packets can be sent when fully formed irrespective of where each component frame was received. The ARQ state and packet sequence number information from the two links 326, 346 enables this correlation to be made. The potential loss of a mac_frame 317,328 between the old AR 304 and the new AR 306 can be dealt with in one of two ways. They can be sent using TCP/SCTP retransmission capabilities or the new AR 306 signals to the MN 110 information on outstanding mac_frames 337 for a packet so that the MN 310 resending over either link 326,346 can repair this frame loss. This acts as a very slow ARQ repair mechanism and requires the MN 310 to keep packets until a packet completion event, containing a packet SN is received from the new AR 306.

What is claimed is:

1. A method of operating a first access router, the method comprising:

increasing the transmission scheduling priority of packets in an existing packet flow directed towards a mobile node undergoing a hand-off from the first access router to a second access router, said increase in transmission scheduling priority being relative to packets directed to mobile nodes at the first access router which are not undergoing a hand-off;

communicating at least some packets from said existing packet flow over an existing downlink between the first access router and said mobile node following said increase in transmission scheduling priority; and wherein said packets which are provided an increase in the transmission scheduling priority are a portion of all packets to be transmitted that are stored in the first access router when said mobile node commences hand-off.

2. The method of claim 1, where the amount of increase in transmission scheduling priority is bounded.

3. The method of claim 1, wherein the transmission scheduling priority increase is of an amount that causes interference from the hand-off of the mobile node to be shared between the mobile nodes at the first and second access routers.

4. The method of claim 1 wherein said packets which are provided a higher scheduling priority include a packet corresponding to said existing flow packets that arrives at the first access router after said mobile node commences hand-off.

5. The method of claim 1 wherein said increase in transmission scheduling priority is removed when all the packets corresponding to said existing packet flow stored in the first access router at the start of hand-off have been transmitted by the first access router to the mobile node.

6. The method of claim 1, wherein said packets which are provided a higher scheduling priority are application packets.

7. The method of claim 6, wherein said downlink is a wireless downlink.

8. A method of operating a first access router, the method comprising:
increasing the transmission probability of packets directed towards a mobile node undergoing a hand-off from the first access router to a second access router, said packets corresponding to a packet flow existing prior to initiation of said hand-off;
communicating at least some of said packets over an existing downlink between the first access router and said mobile node following said increase in transmission probability; and
wherein said packets for which the transmission probability is increased are a portion of all packets to be transmitted that are stored in the first access router when said mobile node commences hand-off.

9. The method of claim 8,
wherein the step of increasing said transmission probability includes the step of increasing a transmission scheduling priority.

10. The method of claim 9, where the amount of increase in transmission scheduling priority is bounded.

11. The method of claim 8,
wherein the transmission probability increase is of an amount that causes interference from the hand-off of the mobile node to be shared between the mobile nodes at the first and second access routers.

12. The method of claim 8,
wherein increasing transmission probability includes increasing the transmission scheduling priority of said mobile node undergoing said hand-off.

13. The method of claim 8 wherein said packets which are provided a higher scheduling priority include a packet that arrives at the first access router after said mobile node commences hand-off.

14. The method of claim 8 wherein said increase in transmission probability is removed when all the packets stored in the first access router corresponding to said existing packet flow at the start of hand-off have been transmitted by the first access router to the mobile node.

15. The method of claim 8, wherein said packets are application packets.

16. The method of claim 15, wherein said downlink is a wireless downlink.

17. A first access router, comprising:
means for increasing the transmission scheduling priority of packets in an existing packet flow directed towards a mobile node undergoing a hand-off from the first access router to a second, said increase in transmission scheduling priority being relative to packets directed to mobile nodes at the first access router which are not undergoing a hand-off;
means for communicating at least some packets from said existing packet flow over an existing downlink between the first access router and said mobile node following said increase in transmission scheduling priority; and
wherein said packets which are provided an increase in the transmission scheduling priority are a portion of all packets to be transmitted that are stored in the first access router when said mobile node commences hand-off.

18. The first access router of claim 17, where the amount of increase in transmission scheduling priority is bounded.

19. The first access router of claim 17, wherein the priority increase is of an amount that causes interference from the hand-off of the mobile node to be shared between the mobile nodes at the first and second access routers.

20. The first access router of claim 17 wherein said packets which are provided a higher scheduling priority include a packet corresponding to said existing flow packets that arrives at the first access router after said mobile node commences hand-off.

21. The first access router of claim 17, wherein said packets which are provided a higher scheduling priority are application packets.

22. The first access router of claim 21, wherein said downlink is a wireless downlink.

23. A first access router, comprising:
means for increasing the transmission probability of packets directed towards a mobile node undergoing a hand-off from the first access router to a second access, said packets corresponding to a packet flow existing prior to initiation of said hand-off, said increase in priority being relative to packets of other mobile nodes not undergoing a hand-off;
means for communicating at least some of said packets over an existing downlink between the first access router and said mobile node following said increase in transmission probability; and
wherein said packets for which the transmission probability is increased are a portion of all packets to be transmitted that are stored in the first access router when said mobile node commences hand-off.

24. The first access router of claim 23, wherein said means for increasing said transmission probability includes means for increasing a transmission scheduling priority.

25. The first access router of claim 23, wherein said packets are application packets.

26. The first access router of claim 25, wherein said downlink is a wireless downlink.

27. A first access router, comprising:
a scheduling module for increasing the transmission scheduling priority of packets in an existing packet flow directed towards a mobile node undergoing a hand-off from the first access router to a second access router, said increase in transmission scheduling priority being relative to packets directed to mobile nodes at the first access router which are not undergoing a hand-off;
an interface for communicating at least some packets from said existing packet flow over an existing downlink between the first access router and said mobile node following said increase in transmission scheduling priority; and
wherein said packets which are provided an increase in the transmission scheduling priority are a portion of all packets to be transmitted that are stored in the first access router when said mobile node commences hand-off.

28. The first access router of claim 27, where the amount of increase in transmission scheduling priority is bounded.

* * * * *